Sept. 26, 1939.  H. J. HORN  2,174,087
VEHICLE WHEEL
Filed April 27, 1935   2 Sheets-Sheet 1
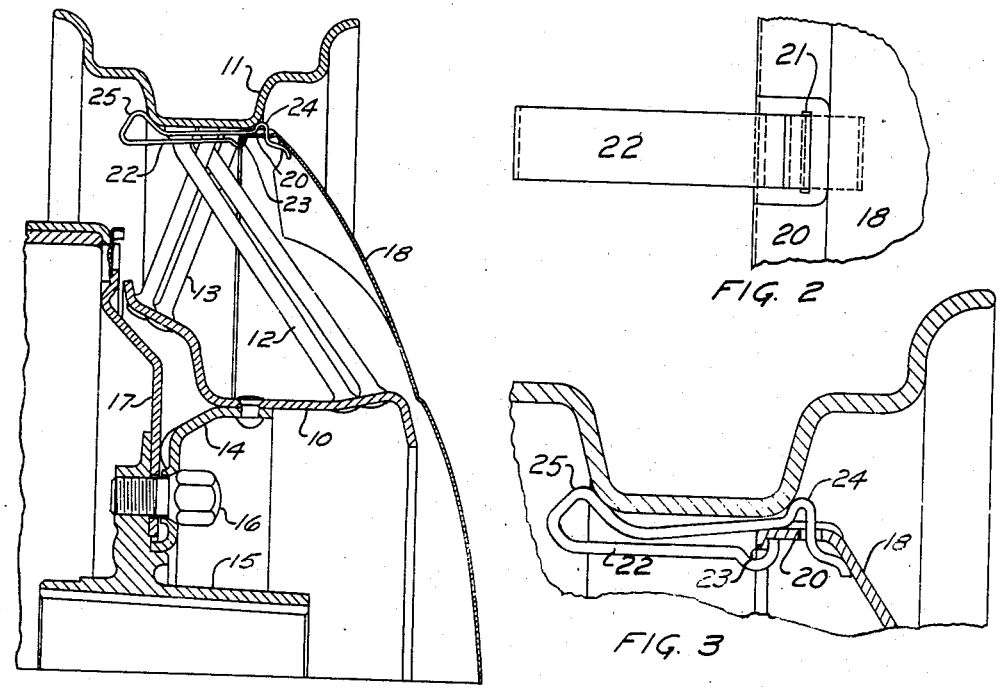
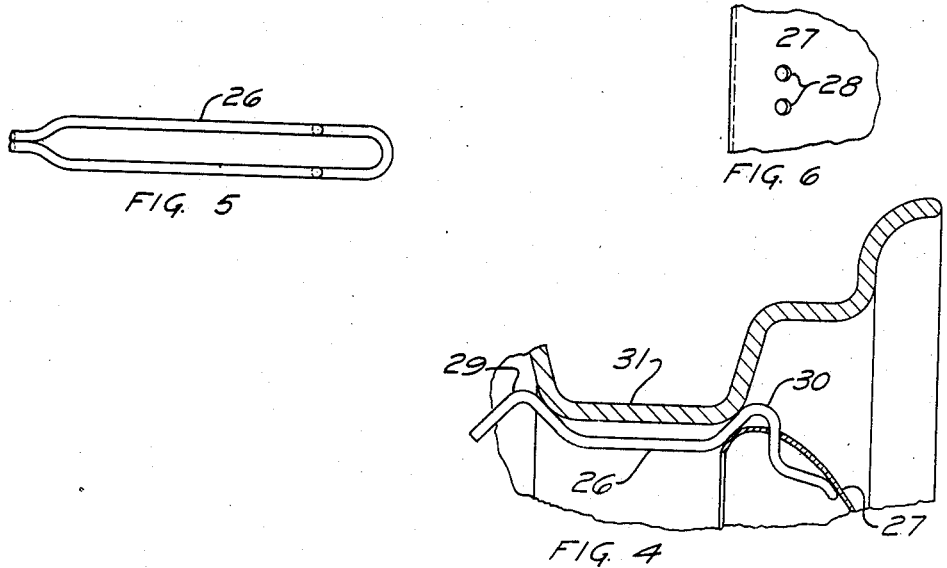
INVENTOR.
HARRY J. HORN
BY
Carroll R Taber
ATTORNEY.

Sept. 26, 1939.   H. J. HORN   2,174,087
VEHICLE WHEEL
Filed April 27, 1935    2 Sheets-Sheet 2

INVENTOR.
HARRY J. HORN
BY
Carroll R. Taber
ATTORNEY.

Patented Sept. 26, 1939

2,174,087

UNITED STATES PATENT OFFICE

2,174,087

VEHICLE WHEEL

Harry J. Horn, Lansing, Mich., assignor to Motor Wheel Corporation, Lansing, Mich., a corporation of Michigan Application April 27, 1935, Serial No. 18,617

6 Claims. (Cl. 301—37)

This invention relates to vehicle wheels and more particularly to the combination with a wheel and a cover therefor of means for detachably connecting the cover to the wheel. In one form of the invention the means for attaching the cover to the wheel comprises a plurality of resilient attaching clips permanently secured to the cover adjacent its periphery. In another form of the invention the attaching means comprises resilient attaching clips removably secured to the cover solely by means of the cooperative configuration of the clip and the cover. In both forms of the invention the attaching clip is of the type adapted to resiliently engage the wheel rim and may be formed to engage the rim at opposite sides thereof whereby to eliminate contact between the cover and the rim.

Illustrative examples of the invention are shown in the accompanying drawings, wherein:

Figure 1 is a partial sectional view of a wheel showing a cover detachably connected thereto by a resilient attaching clip;

Figure 2 is a partial top plan view of the attaching clip and cover of Figure 1;

Figure 3 is an enlarged partial sectional view of the rim, cover and attaching clip shown in Figure 1;

Figure 4 is a partial sectional view of a rim, cover and attaching clip, showing a modified form of attaching clip;

Figure 5 is a plan view of the attaching clip shown in Figure 4;

Figure 6 is a partial plan view of the cover shown in Figure 4 illustrating the openings through which the attaching clip extends;

Figure 7:
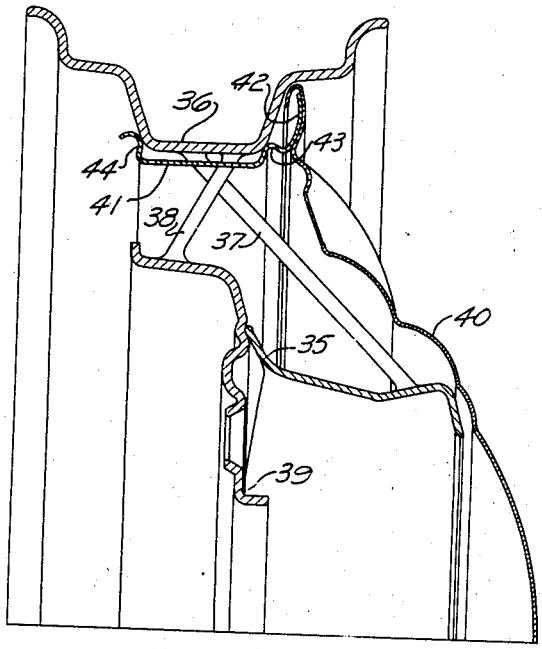
Figure 7 is a partial sectional view taken on substantially the line 7—7 of Figure 8, showing modified form of wheel cover and attaching clip.
Figure 9:
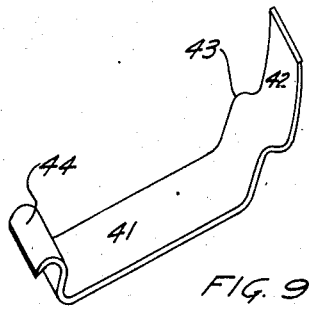
Figure 9 is a perspective view of the attaching clip shown in Figure 7.

The wheel shown in Figure 1 is of the conventional wire spoke type including a hub shell 10, a drop center rim 11 and spokes 12 and 13 joining the rim and hub shell together. The hub shell 10 includes the usual bolting-on flange 14 by means of which the wheel is attached to a hub 15, the attachment being by cap screws 16. A conventional brake drum 17 is mounted on hub 15 between its radially extending flange and the bolting-on flange 14.

A generally disklike cover 18 provided with spoke formations is disposed at one side of the wheel with its periphery adjacent the rim 11.

The periphery of the cover is flanged as indicated at 20. The flanged portion 20 is adapted to lie inside of the base of rim 11. It is provided at circumferentially spaced points with openings 21 for the reception of attaching clips 22. The cover is preferably flattened or depressed in the region of the openings.

Attaching clip 22 is in the form of a flat strip of metal folded back upon itself as clearly shown in Figures 1 and 2. The upper leg of clip 22 is somewhat longer than the lower leg and is provided at its free extremity with a deformed portion which permits the insertion of that extremity into the opening 21 but prevents the rotation of the clip in a counterclockwise direction beyond a position substantially at right angles to the plane of the cover. The free extremity of the shorter leg of clip 22 is provided with a hooked portion 23 adapted to engage the beaded edge of cover 18 when the clip is rotated to the limit of its movement in a counterclockwise direction. The clip is thus firmly but detachably connected to the cover 18. To install the clip it is inserted into opening 21 from a vertical position and then rotated in a counterclockwise direction until portion 23 engages the edge of the cover.

The longer and upper leg of clip 22, adjacent its free extremity, is deformed as indicated at 24. This deformation is adapted to contact the adjacent side of rim 11 when the cover and clip are assembled with the wheel. At its opposite extremity, the upper leg of clip 22 is deformed as indicated at 25 which deformation is adapted to engage the side of rim 11 remote from cover 18 when the cover 18 is pressed axially toward the rim 11. It will be understood, of course, that clip 22 is sufficiently resilient to permit the deflection of deformation 25 whereby the same may pass inside of the base of rim 11 in attaching or detaching the cover. When the cover is attached to the wheel as shown in Figure 1 it is firmly held in position by reason of the contact between deformations 24 and 25 and the opposite sides of rim 11. The cover 18 does not contact the rim.

In the modified construction shown in Figures 4, 5, and 6, the attaching clip 26 is in the form of a strand of wire bent to the desired formation. The cover 27 is provided with holes 28 in pairs spaced about its periphery. The ends of the wire forming clip 26 are adapted to be inserted into openings 28. These ends, as clearly shown in Figure 6, are formed to assume a position adjacent each other. By reason of the flexibility of the wire they may be spread apart sufficiently to permit their insertion in the openings 28. After they have been inserted in the openings the ends of the wire return to the position shown in Figure 5 thereby locking the clip to the cover 27.

As in the case of clip 22, the attaching clip 26 is deformed to engage the inner and outer surface of cover 27 whereby to limit the rotary movement of the clip in a counterclockwise direction to a position substantially at right angles to the plane of the cover. The clip is securely but detachably connected to the cover solely by means of the cooperating configuration of these two parts.

Deformations 29 and 30 are formed adjacent the opposite extremities of the clip 26 in spaced relation to each other. These deformations are adapted to engage the opposite sides of the base of the rim 31 when the cover is attached to the rim. Clip 26 is flexible to a sufficient extent to permit the deflection of deformation 29 whereby the same may pass inside of the base of rim 31 in attaching or detaching the cover to the wheel. The cover 27 does not contact the rim 31 when it is installed on the wheel. It is firmly held in position on the wheel solely by means of the attaching clips 26.

The wheel illustrated in Figure 7 is of the same general type of construction as that illustrated in Figure 1 comprising a hub shell 35, a drop center rim 36, and interconnecting spokes 37 and 38. The hub shell 38 includes the bolting on flange 39 by means of which the wheel is attached to a hub in a conventional manner.

A generally disklike cover 40 is arranged with its periphery adjacent one of the side walls of rim 36. Inwardly of its periphery there is attached to cover 40 at circumferentially spaced intervals a plurality of resilient attaching clips 41. These attaching clips are connected to the cover 40 preferably by being welded thereto.

Each of the clips 41 is provided with a leg 42 which serves in attaching the clip to the cover and a laterally extending base portion of the same general configuration as the base of rim 36. At the inner extremity, adjacent the cover 40, of each of the clips 41 there is formed a shoulder 43. The outer extremity of each of the clips is provided with a deformed portion 44. As shown in Figure 7 the shoulder 43 contacts one side of rim 36 and deformed portion 44 contacts the other side of rim 36 when the cover is installed on the wheel.

Figure 8:
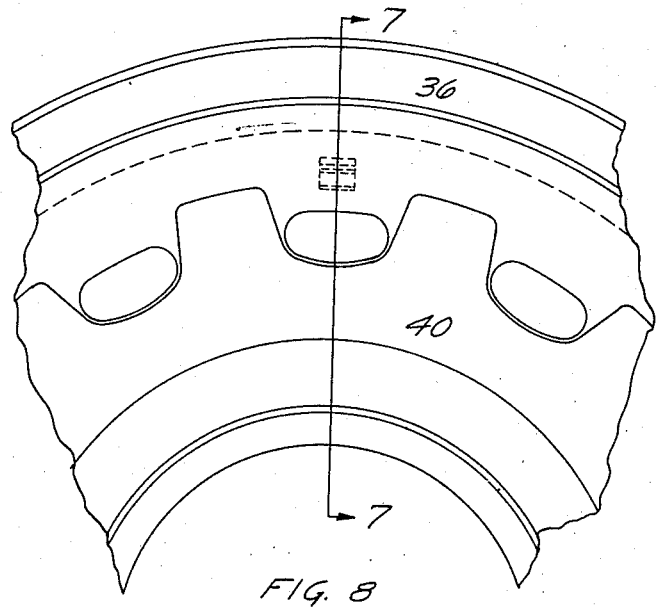
Figure 8 is a partial front view in elevation of the construction shown in Figure 7.

As previously mentioned, clips 41 are formed of resilient material and they are sufficiently flexible to permit deformation 44 to pass inside the base of rim 36 when the clip is being installed or removed from the rim. When the cover is attached to the rim as shown in Figure 8 it is preferably out of contact with the rim 36.

From the foregoing description it will be apparent that the present invention provides attaching clips either permanently or detachably connected to a cover which serve to detachably connect the cover to a wheel without requiring contact between the cover and the wheel. By eliminating contact between the cover and the wheel objectionable noises and squeaks are avoided.

The scope of the invention is indicated in the appended claims.

I claim:

1. The combination with a wheel and a cover therefor of an attaching clip adapted to detachably connect the cover to the wheel while maintaining these parts in spaced relation to each other, said attaching clip being secured to the cover and the wheel solely by means of the interlocking configuration between these parts and the attaching clip.

2. The combination with a wheel cover having a peripheral flange provided with an opening of an attaching clip, said attaching clip comprising a single strip of metal folded to bring the ends thereof in relatively close proximity, one of said ends adapted to be inserted into the opening in the cover and the other end adapted to engage the edge of the cover to lock the clip to the cover.

3. The combination with a wheel and a cover having inner and outer faces and an opening adjacent its periphery of an attaching clip having an end portion projecting through the opening and engaging one face of the cover, another portion of the clip engaging the other face of the cover and extending in a direction substantially opposite to the first mentioned end portion, said other portion being adapted to resiliently engage the wheel to hold the cover in position thereon.

4. The combination with a wheel and a cover having inner and outer faces and an opening adjacent its periphery of a removable resilient attaching clip, said attaching clip having one end portion extending through said opening and bearing against one face of said cover, said clip having another portion bearing against the other face of said cover and extending in a direction substantially opposite to the first mentioned end portion and adapted to resiliently engage said wheel whereby said cover, attaching clip and wheel are secured together when said cover is pressed toward said wheel.

5. The combination with a wheel and a cover having openings therein adjacent its periphery of a substantially U shaped wire attaching clip having its free ends positioned in said openings and provided outwardly of said free ends with spaced apart deformed portions adapted to be pressed into engagement with the wheel to detachably connect the cover thereto.

6. The combination with a wheel and a cover having openings adjacent its periphery of a substantially U shaped wire attaching clip having its inner free extremities disposed within said openings, said clip deformed adjacent its free ends to contact the inner and outer surface of the cover and provided adjacent its outer extremity with a deformation adapted to be pressed into engagement with the side of the wheel remote from the cover.

HARRY J. HORN.